(12) United States Patent
Robert et al.

(10) Patent No.: US 6,498,988 B1
(45) Date of Patent: Dec. 24, 2002

(54) METHOD AND APPARATUS FOR CENTRALIZED PROCESSING OF OILFIELD OR WATERFIELD ENGINEERING DATA FOR DESIGN AND ANALYSIS FROM DISTRIBUTED LOCATIONS

(75) Inventors: Joel A. Robert, Sugar Land, TX (US); Virginia J. Jee, Sugar Land, TX (US); Xiaowei Weng, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 189 days.

(21) Appl. No.: 09/666,729

(22) Filed: Sep. 20, 2000

(51) Int. Cl.[7] ............................................. G01V 9/00
(52) U.S. Cl. .......................................................... 702/6
(58) Field of Search ................................ 702/2, 3, 5, 6, 702/11, 12, 13, 14; 707/10; 703/10

(56) References Cited

U.S. PATENT DOCUMENTS

| | | | |
|---|---|---|---|
| 5,345,586 A | * | 9/1994 | Hamala et al. ................ 707/10 |
| 5,596,494 A | * | 1/1997 | Kuo ................................ 702/2 |
| 5,884,224 A | * | 3/1999 | McNabb et al. ................ 702/2 |
| 5,959,547 A | * | 9/1999 | Tubel et al. ................ 166/372 |

OTHER PUBLICATIONS

Fenwick, "Use of Java™ Technology for Web–Based Reservoir Engineering Applications," *Society of Petroleum Engineers 63002*, pp. 1–6, Oct. 1–4, 2000.

* cited by examiner

*Primary Examiner*—Donald E. McElheny, Jr.
(74) *Attorney, Agent, or Firm*—Catherine Menes; Brigitte Jeffery

(57) ABSTRACT

A technique for centralized processing of oilfield or waterfield engineering data for design and analysis from distributed locations is disclosed. In one aspect, the invention includes a method comprising: acquiring a plurality of oilfield or waterfield data; establishing a communications link between a client computing device to a server computing device; inputting data from the client computing device to the server computing device; processing the data at the server computing device; and communicating the results to the client computing device. In a second aspect, the invention includes a computing system, comprising: a client computing device; a server computing device interconnected with the client computing device; and an analysis tool resident on the server. The analysis tool includes a calculation engine capable of analyzing the data entered from the client computing device; and a plurality of program utilities for use by the calculation engine in analyzing the data.

8 Claims, 5 Drawing Sheets

METHOD AND APPARATUS FOR CENTRALIZED PROCESSING OF OILFIELD OR WATERFIELD ENGINEERING DATA FOR DESIGN AND ANALYSIS FROM DISTRIBUTED LOCATIONS

BACKGROUND OF THE INVENTION

1. Field of the Invention

The present invention relates generally to hydrocarbon (petroleum and natural gas) production from wells drilled in the earth, and, more particularly, the centralized processing of oilfield or waterfield engineering data for the design and analysis of procedures associated with such drilling and production from distributed locations.

2. Description of the Related Art

Hydrocarbon production typically involves drilling a well through the earth's subsurface to a hydrocarbon deposit and then extracting the hydrocarbons. Drilling a well in the subsurface is expensive, which limits the number of wells that can be economically drilled. Also, even the most skilled and talented people using the most sophisticated tools and techniques will occasionally drill "dry holes," i.e., wells that do not produce. The relatively high expense, the limited number of wells, and the occasional failures drive producers to more quickly, accurately, and efficiently locate, and extract hydrocarbon deposits. Producers have consequently developed an extensive body of technology surrounding the location and production of hydrocarbons. Different parts of this technology deal with, for example, measuring physical and/or electrical characteristics of geological formations, facilitating the drilling of bore holes, and stimulating production. Typically, these areas of the technology intersect.

Consider, for instance, a production stimulation technique known as "fracturing." The rate of flow, or "production" of hydrocarbon from a geologic formation depends on numerous factors. One factor is the radius of the bore hole. As the radius of the bore hole increases, the production rate increases, everything else being equal. Another factor, related to the first, is the flowpaths available to the migrating hydrocarbon. The expense of drilling a well only generally increases as the size of the hole increases. However, a larger hole imparts greater instability to the geologic formation. This increased instability increases the chances that the formation will shift, and therefore damage the well bore or, at worst, collapse the well bore. So, while a larger bore hole will, in theory, increase hydrocarbon production, it is impractical and carries a significant downside. Yet, a fracture or large crack within the producing zone of the geologic formation, originating at and radiating from the well bore, can actually increase the "effective" (as opposed to "actual") well bore radius. The well then behaves (in terms of production rate) as if the entire well bore radius were much larger.

Such a fracture can be intentionally created to stimulate production, and this technique is known as fracturing. Hydraulic fracturing involves literally breaking or fracturing a portion of the surrounding strata, by injecting a specialized fluid into the well bore directed at the face of the geologic formation at pressures sufficient to initiate and/or extend a fracture in the formation. More particularly, a fluid is injected through a well bore. The fluid exits through perforations in the well casing and is directed against the face of the formation at a pressure and flow rate sufficient to overcome the in situ stress (a.k.a. the "minimum principal stress") and to initiate and/or extend a fracture(s) into the formation. Actually, what is created by this process is not always a single fracture, but a fracture zone, i.e., a zone having multiple fractures, or cracks in the formation, through which hydrocarbon can more readily flow to the well bore.

In practice, fracturing a well is a highly complex operation performed with the complex orchestration of over a dozen large trucks, roughly the same number of highly skilled engineers or technicians, a mobile laboratory for real-time quality assurance, and powerful integrated computers that monitor pumping rates, downhole pressures, etc. During a typical fracturing job, over 350,000 pounds of fluid will be pumped at extraordinarily high pressures (exceeding the minimum principal stress) down a well, to a pinpoint location, often thousands of feet below the earth's surface. Moreover, during the fracturing process, constant iterations of fluid level, pumping rates, and pumping times are performed to maximize the fracture zone, and minimize the damage to the formation.

Consider also, the use of drilling fluids known as muds. A drilling fluid or "mud" is typically continuously circulated from the surface down to the bottom of a well bore being drilled and back to the surface again. The mud has several functions, one of them being to transport cuttings removed by the drill bit up to the surface where they are separated from the mud. A second function is to form a filtercake on the walls of the bore hole so as to avoid a collapse of the bore hole. However, the filtercakes formed on the bore hole walls can cause damage to the reservoir and impair productivity unless they are removed or bypassed after drilling. The process of filtercake removal in open hole wells is frequently called "mud clean up."

The data needed to properly design well procedures, such as fracturing or mud clean up treatments is acquired by logging or other methods of measuring reservoir properties, including, but not limited to, coring, fluid sampling, or pressure testing. This data is then analyzed and used in a variety of engineering calculations to determine the best methods of completing, producing, or stimulating a particular well. The final choice of completion or stimulation method may have a large effect on the ultimate producing efficiency of the well and its economic success. During the productive life of a well or reservoir, the data may also be used to design remedial treatments or changes in production methods.

The efficient production of hydrocarbons requires constant monitoring and maintenance of the producing wells and reservoir. Proper completion procedures and equipment are needed to insure adequate contact between the well and the reservoir. Stimulation treatments may be required to improve productivity from or infectivity into the reservoir for production enhancement. The design of well and reservoir treatments involves many steps, such as problem identification, appropriate treatment selection, fluid selection, placement process determination, and volume and rate calculations. Specifying mechanical equipment may also be required. After implementation, the effects of the various treatments are often analyzed to determine results and to improve future treatments. Many of the steps in design and analysis require some type of calculation to be made. The production, operations, reservoir, or service provider engineer at each field location typically performs these calculations. Frequently, the calculations involve the use of equations that are very well known in the art.

Large international companies typically have multiple field locations where such design and analyses are conducted on a routine basis. The engineers at each location may have their own method of making a particular calculation, and thus the same type of analysis may vary among the locations. For instance, an engineer at one location might perform an analysis using a software implemented analysis tool that embodies certain assumptions about the data operated on or employs a particular set of units of measurement. An engineer at a second location might perform the very same analysis using an analysis tool that embodies a second set of assumptions different from those in the first analysis tool and/or different units of measurement.

Each location or engineer may therefore have their own method of performing some particular analysis. For a large corporation, this means that many people are performing the same analysis in myriad ways. This is especially true when new products are introduced. The methodology for treatment design calculations is passed on in schools and by word or mouth within the organization. Each transmittal of the information increases the risk of misinterpretation and corruption of the calculation. Perhaps even worse, when one engineer borrows or trades for another's tool, that engineer is not aware of the assumptions or the units of measurement used by the tool. This leads to significant and, if not caught in time, costly errors.

This distributed analysis impacts the marketing of oilfield or waterfield services by oilfield or waterfield service providers. Oilfield or waterfield service providers frequently provide services where they analyze data for their clients. Knowing which of the provider's engineers are performing what calculations can help a provider market the services employing those calculations. However, the distributed nature of the current configuration makes this difficult. Although tracking new product usage typically occurs after release, the distribution of the usage hampers thorough, accurate collection of this information. Frequently, this information is obtained only after someone in the field has a problem and contacts the design team for help. This type of information consequently is of little assistance in marketing.

The present invention is directed to resolving, or at least reducing, one or all of the problems mentioned above.

SUMMARY OF THE INVENTION

The invention is a technique for centralized processing of oilfield engineering data for design and analysis from distributed locations.

In one aspect, the invention includes a method comprising: acquiring a plurality of oilfield or waterfield data; establishing a communications link between a client computing device to a server computing device; inputting data from the client computing device to the server computing device; processing the data at the server computing device; and communicating the results to the client computing device.

In a second aspect, the invention includes a computing system, comprising: a client computing device; a server computing device interconnected with the client computing device; and an analysis tool resident on the server. The analysis tool includes a calculation engine capable of analyzing the data entered from the client computing device; and a plurality of program utilities for use by the calculation engine in analyzing the data.

BRIEF DESCRIPTION OF THE DRAWINGS

The invention may be understood by reference to the following description taken in conjunction with the accompanying drawings, in which like reference numerals identify like elements, and in which.

Figure 1:
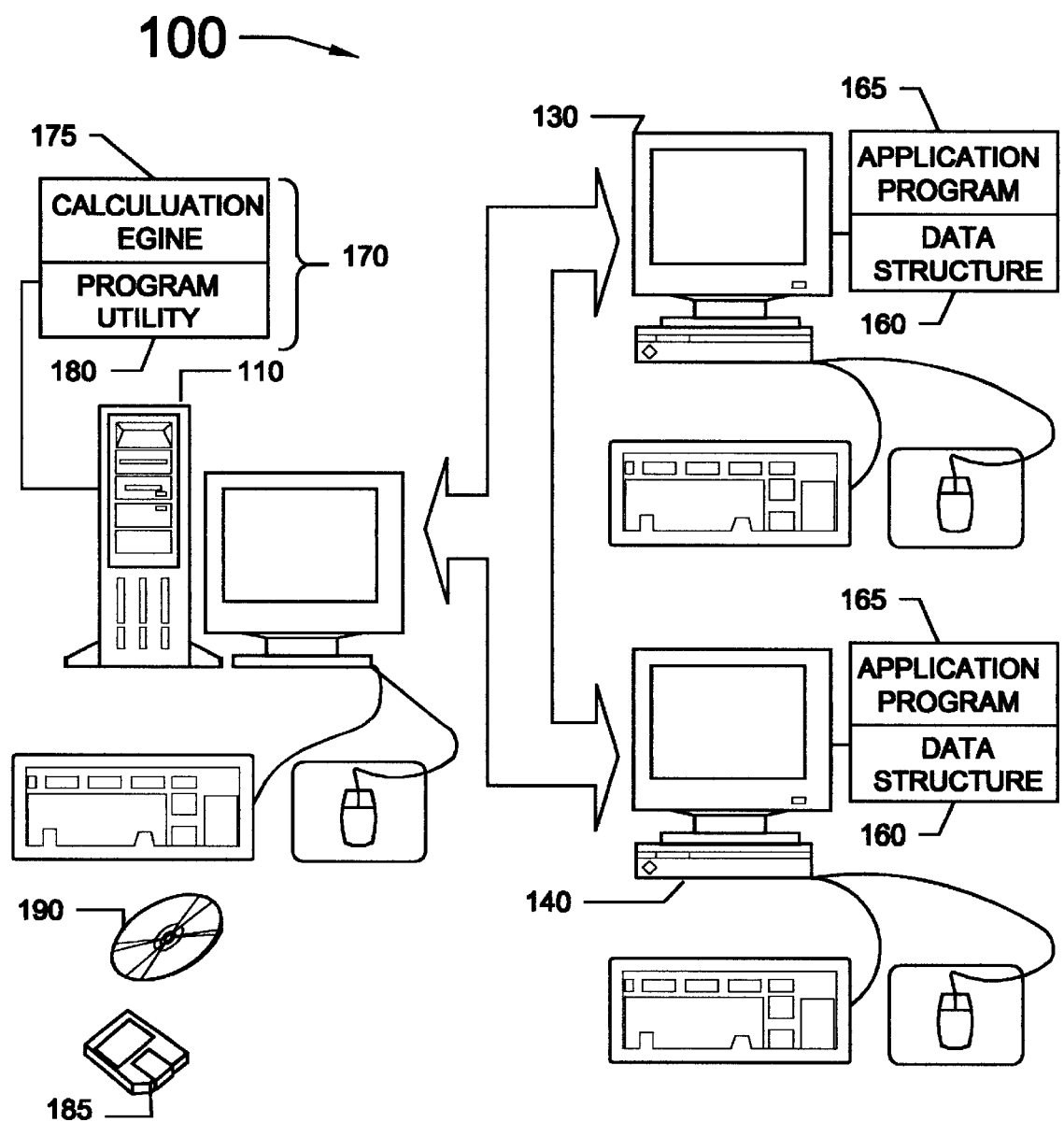
FIG. 1 conceptually depicts one particular embodiment of a computing system programmed and operated in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

FIG. 1 illustrates a computing system 100 constructed, configured, and operated in accordance with the present invention. The computing system 100 implements a two-tier architecture known as a "client/server" architecture. In a client/server architecture each computing device or process on a given system is either a "client" or a "server." Servers typically are powerful computers or processes dedicated to managing system resources, such as disk drives (file servers), printers (print servers), or system traffic (system servers). Clients typically are personal computers or workstations on which users run applications. Clients rely on servers for resources, such as files, devices, and even processing power necessary or desirable to run their applications. Servers are often dedicated, meaning that they perform no other tasks besides their server tasks, but this is not strictly necessary.

The computing system 100 comprises a server computing device 110, hereafter referred to as the "server," interconnected over a communications link 120 with a first client computing device 130 and a second client computing device 140, hereafter referred to as "clients." In the illustrated embodiment, the server 110, client 130, and client 140 are "networked," and the computing system 100 is a computer network. In various embodiments, this network may be a local area network ("LAN") or a wide-area network ("WAN"). In one implementation, the computing system 100 comprises a part of the Internet wherein the server 110 is interconnected with the clients 130, 140 over the Internet. Alternatively, the network may comprise a portion of an "intranet," which is a computing system that operates like the Internet, but requires special authorization to access. Such access is typically only granted to employees and/or contractors of the enterprise that constructs and maintains the computing system.

One of the defining characteristics of the Internet is that communications among the computers utilize the Transmission Control Protocol/internet Protocol ("TCP/IP") as do many intranets. There are many other protocols that may instead be employed for, among other reasons, security purposes. Because the TCP/IP protocol is so widely used, it is generally preferred that communications over the communications link 120 be in accordance with the TCP/IP protocol. However, the invention is not so limited and any other protocol known to the art may be used in alternative embodiments.

The invention admits wide variation in the hardware implementation of the computing system 100. For instance, the clients 130, 140 illustrated are work stations, but may alternatively be desktop personal computers, laptop computers, handheld personal computers, or even some other type of computing device altogether. The server 110 and the clients 130, 140 may operate under the control of any suitable operating system ("OS") known to the art. Thus, the OS may be any one of a Windows, UNIX, or disk operating system ("DOS")-based OS. Similarly, the transmission medium of the communications link 120 may be implemented using a wide variety of technologies including, but not limited to, coaxial cables, optical fibers, or twisted wire pairs. The communications link 120 might even be wireless in some embodiments. This aspect of any given implementation will be predicated on traditional design constraints such as the installed base, cost, and performance.

A local data structure 160 resides on each one of the clients 130, 140. The data structures 160 may be any type of data structure known to the art, e.g., a linked list, a database, or a file. The data structure 160 contains a plurality of data entered locally by a user (not shown) after connection to the server 110 through an application program 165 that also resides on the client 130, 140. The application program 165 used is the client computer's WEB browser, such as Netscape Inc.'s Netscape Navigator™ or Microsoft Corp.'s Internet Explorer.™ In one particular embodiment, the data structure 160 comprises a file storing data in an Extendable Markup Language ("XML") format.

An analysis tool 170 resides on the server 110. The analysis tool 170 includes a calculation engine 175 and various program utilities 180. The calculation engine 175 provides the computational power for the analysis that is to be performed and is capable of using the data stored in the data structure 160. In some embodiments, multiple analysis tools 170 might reside on the server 110, each analysis tool 170 being dedicated to a different type of analysis. The program utility 180 provides certain functionalities that will be common to multiple analysis tools 170 in analyzing data. Such functionalities include, but are not limited to, unit conversions, data entry validation, supplying data common to various analyses (e.g., commonly used constants, etc.).

Figure 2:
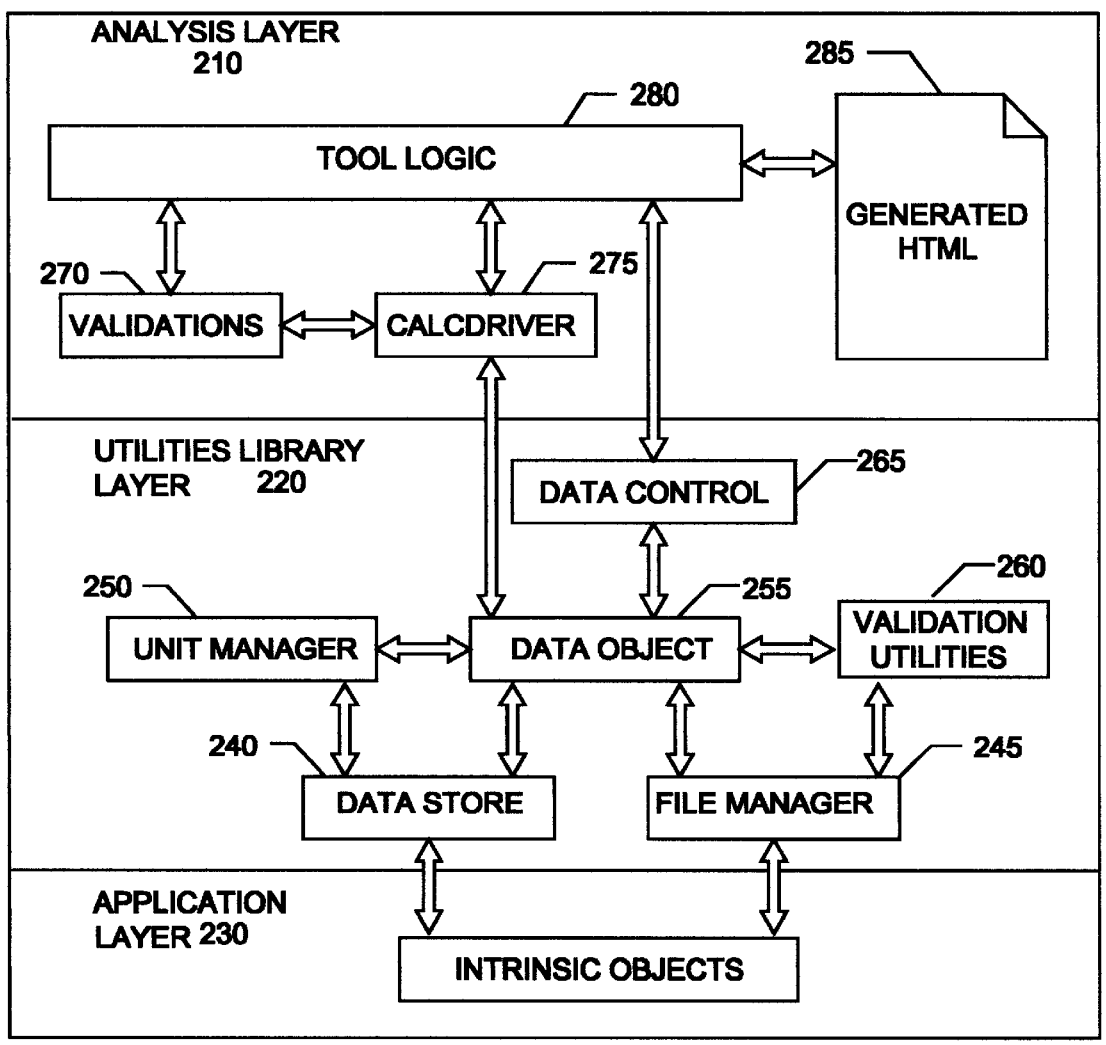
FIG. 2 illustrates the functional layering of the analysis tool residing on the server computing system in FIG. 1 and how it connects to the network.

FIG. 2 illustrates a functional conceptualization 200 of one implementation of the analysis tool 170 residing on the computing system 100 in FIG. 1. Functionally, the analysis tool 170 is, in this particular implementation, composed of three major layers:

- an analysis layer 210 providing the main programming of the specific analysis tool;
- a utilities library layer 220 resting on top of the analysis layer 210 that to provides common functionality for all applications; and
- an application layer 230 through which the tool 170 is connected to the client 130, 140.

Relating the functional layers 210, 220, 230 in FIG. 2 to the physical implementation 100 in FIG. 1:

- the analysis layer 210 is implemented in the analysis tool 170 and can connect to the data structure 160;
- the utilities library layer 220 is implemented in the program utility 180; and
- the application layer 230 is implemented on the server 110 as part of the analysis tool 170.

Note that the invention is not so limited, and may be alternatively implemented, e.g., more or fewer layers, in alternative embodiments.

More particularly, the analysis layer 210 provides basic functionality such as a scripting environment, file access, data handling, and data access. In the illustrated embodiment, Internet Information Server ("UIS"), Active Server Pages ("ASP"), and conventional data structure handling technologies provide these services. The IIS technology is Microsoft Corporation's Web server that runs on Windows NT platforms. Thus, the computing system 100 is, in the illustrated embodiment, a Windows NT system.

The ASP technology is a specification for a dynamically created "Web" pages with a ASP extension that utilizes server-side and client-side scripting—usually visual basic ("VB") Script or JavaScript code. As mentioned earlier, the data structure 160 stores data in pages and, in this particular embodiment, these pages are in an XML format. The server 110 includes an ASP capability that, when the data in the XML format is retrieved, uses the ASP scripting to dynamically reformat the data into a Hypertext Markup Language ("HTML") format. The data can then be sent to the analysis tool 170 in the HTML format. Note that the entire conceptualization 200 is implemented on the server 110.

The user on the client 130, 140 can input data into the analysis tool 170 after connecting to the server computer 110. The data can be used immediately and/or be stored on the client 130, 140 for future use. In some embodiments, the data may be stored on the server 110 in addition to or alternative to storing it on the client 130, 140. If the user wants to analyze previously stored data, he connects to the server 110 then loads the data from the client 130, 140 back to the server 110 so the calculations can be performed.

Within the utilities library layer 220 there are three layers of functionality. At the base layer are a DataStore component 240 and a FileManager component 245. Extending upon that layer are a UnitsManager component 250, DataObject component 255, and Validation Utilities component 260. A DataControl component 265 sits at the top layer. The DataStore component 240 abstracts data storage across user-sessions. Any library or application that needs to store data between user accesses may use the functions. Among other functions, it provides data storage for DataObjects, e.g., the DataObject component 255. The FileManager component 245 supports uploading file content from HTML form submissions generated at the client 130, 140 through application layer 230. The UnitManager component 250 provides unit conversion routines. The DataObject component 255 is the central data structure for applications. Although only one DataObject component 255 is shown for the sake of clarity, any given implementation will include many. Each DataObject contains a value, internal and display unit settings, range limits, and other attributes. All input, intermediate, and calculated values are stored as DataObjects.

At the utilities library layer 220, the Validation Utilities component 260 provides building blocks for user-input validation. This validation is composed of several steps: checking for entered values, checking for valid numbers, and finally checking for values within ranges. Additionally, there are checks for data dependencies of calculated results to input values. The DataControl component 265 provides a layer between HTML forms at the DataObject component 255. It handles displaying of DataObject values, labels, and unit tags. It also implements form value-to-data conversion with associated validation routines.

Resting on top of the functionality provided by the utilities library layer 220 is the analysis layer 210. The analysis layer 210 comprises the analysis tool 170 itself. The code in this layer 210 need only define application-specific functionality, such as the following:

DataObject initialization (names, units, ranges);

data input forms;

results tables and reports;

validation rules; and calculation routines.

More particularly, the analysis layer 210 includes a validations component 270, which contains validation rules and CalcDriver component 275, which contains the routines that actually implement the equations to perform the calculations, the calculation engine 175. The tool logic 280 invokes the validations component 270 and the CalcDriver component 275, as needed, to perform the analysis. The tool logic 280 also invokes various components in the utilities library layer 220 to facilitate the analysis.

Two exemplary analysis tools are the ScaleFRAC Recharge Simulator and the MudSOLV tools currently employed by Schlumberger Oilfield Services. The ScaleFRAC tool determines the volume of scale inhibitor required for a squeeze treatment in an existing fracture. It also calculates the injection pressure as a function of pumping time. This is important because the injection pressure must stay well below the fracture closure pressure to ensure inhibitor placement without displacing proppant from the near well bore portion of the fracture. The MudSOLV calculation determines the volume of mud filter cake removal chemicals needed to treat the open hole portion of the well, the time required to place the treatment, the amount and concentration of bridging material dissolver needed (if used), and estimates of post-treatment skin (if laboratory data is available). The equations needed for these analyses are well known and widely employed in the industry. Alternative tools performing these same analyses may alternatively be employed. Indeed, tools for performing alternative analyses, as may become apparent to those skilled in the art having the benefit of this disclosure, may also be used in alternative embodiments.

Figure 3:
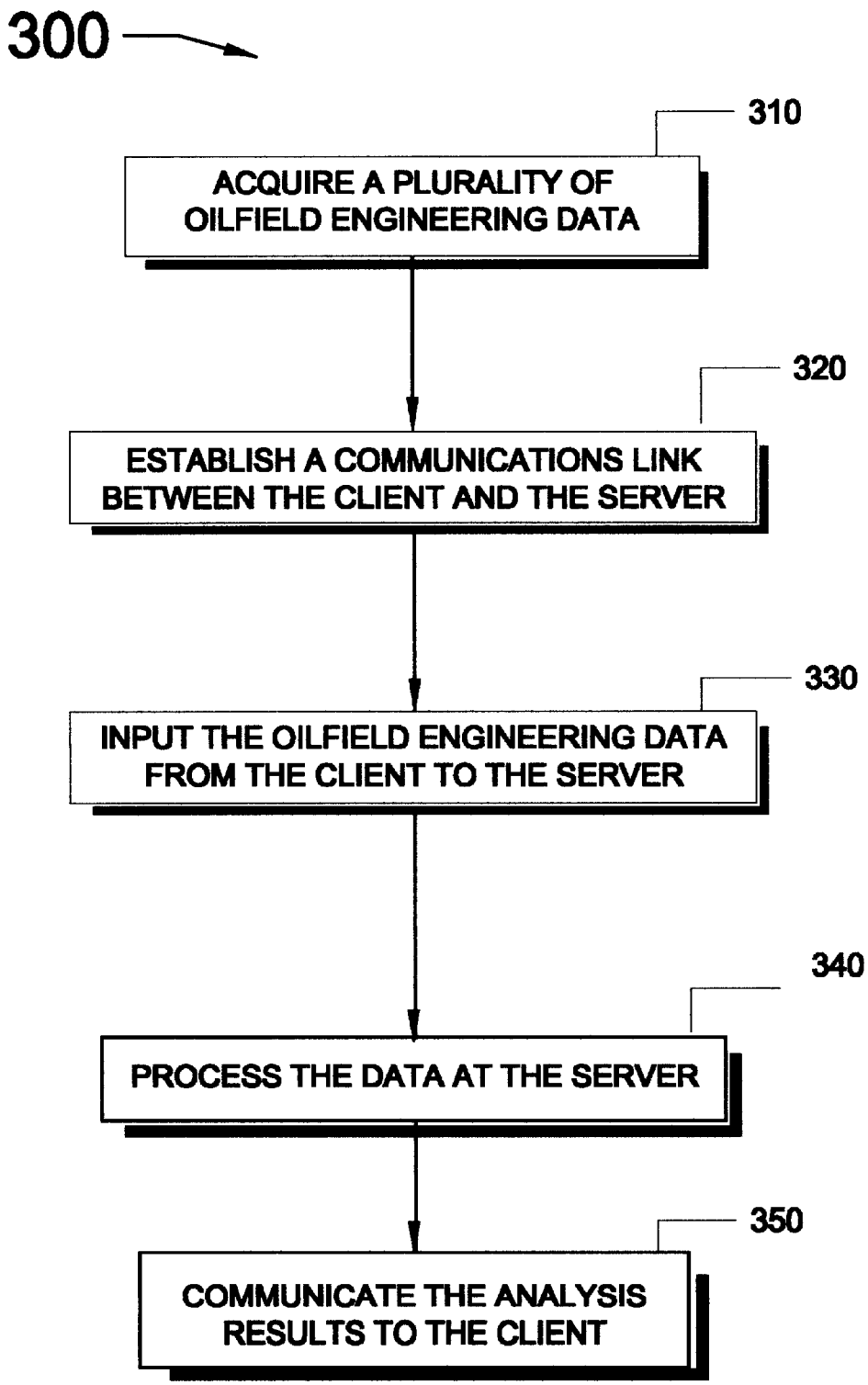
FIG. 3 illustrates one particular embodiment of a method for centralized processing of oilfield or waterfield engineering data from distributed locations in accordance with the present invention.

FIG. 3 illustrates the methodology used for data processing described in this application. The method 300 begins by acquiring a plurality of oilfield or waterfield data, as set forth in the box 310. Data acquisition may be performed in accordance with any technique known to the art. Two methods of data acquisition in a drilling and/or production environment include: wireline ("WL") measurement and measurement while drilling ("MWD"). One exemplary embodiment of each is shown in FIG. 4A and FIG. 4B.

Figure 4A:
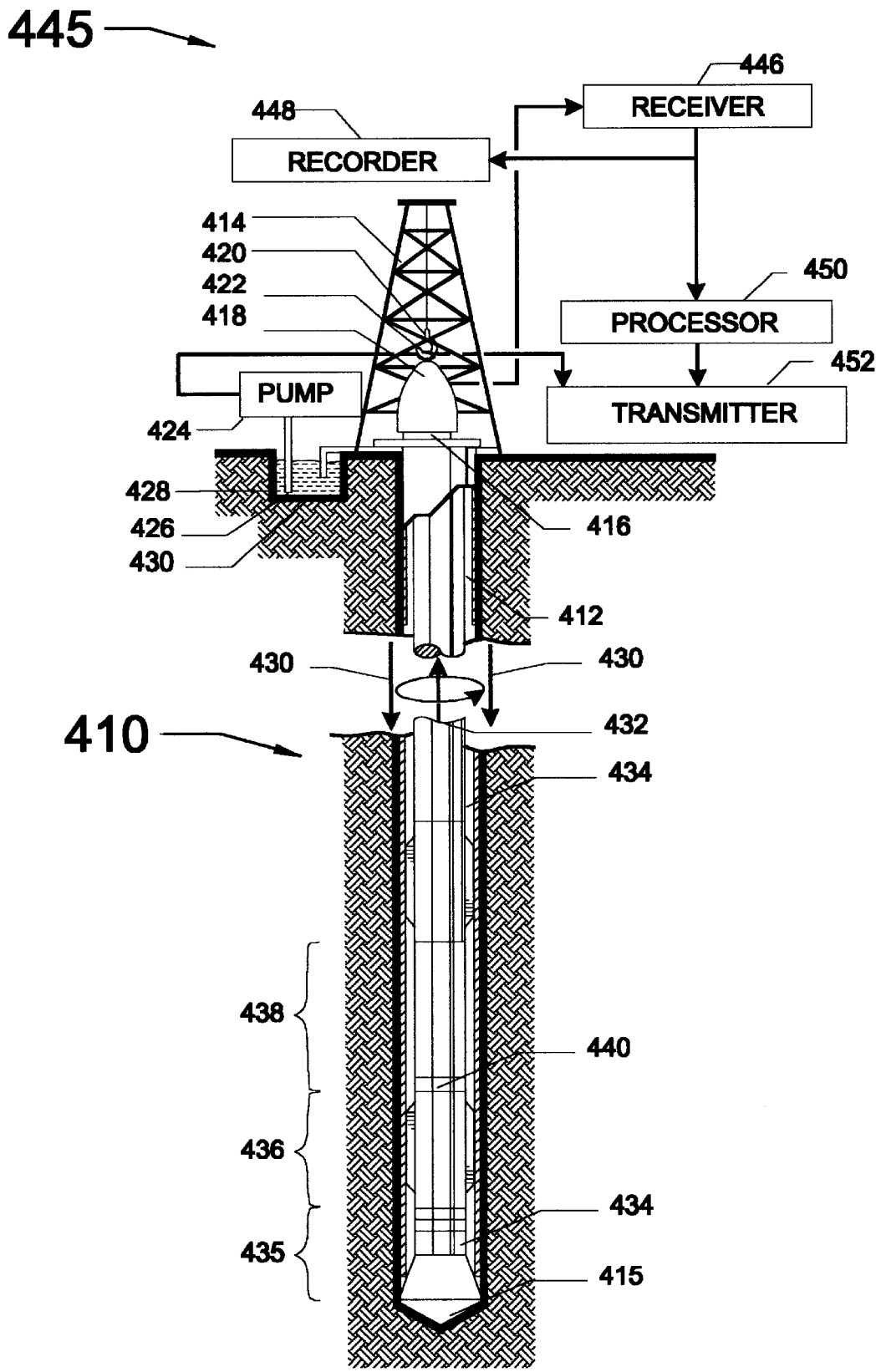
FIG. 4A and FIG. 4B illustrate a measurement while drilling operation and a wireline logging operation, respectively, by which geophysical data may be acquired.
Figure 4B:
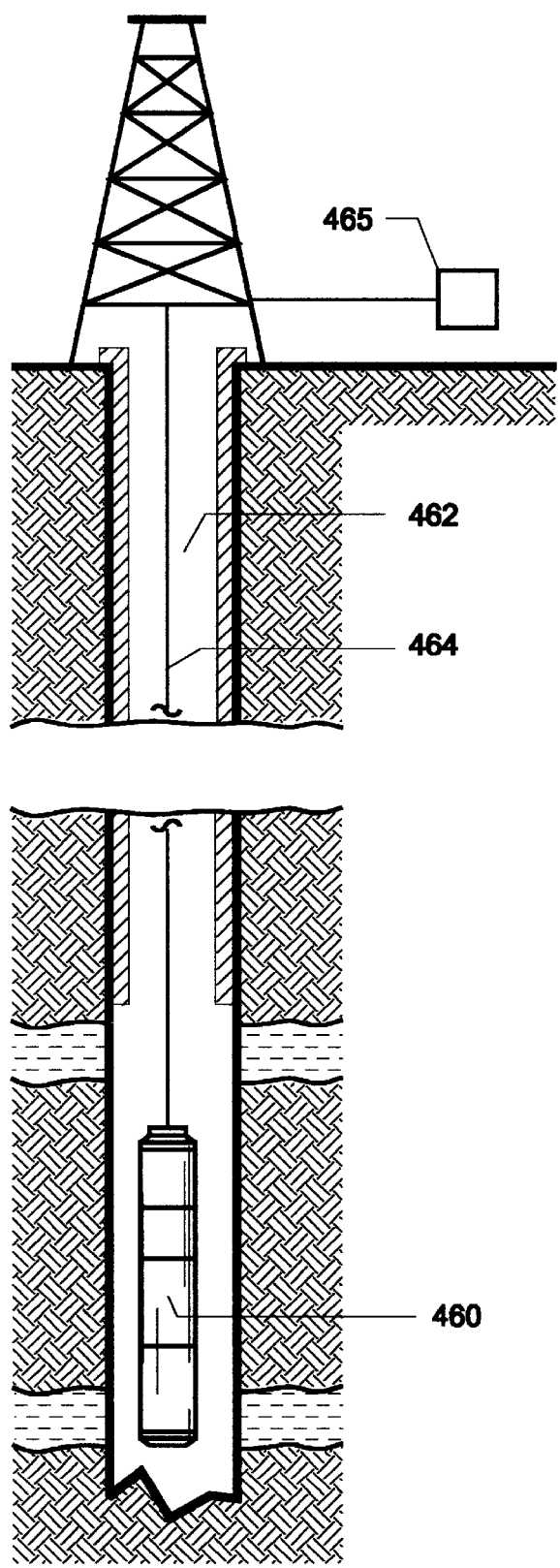

FIG. 4A illustrates a drill string 410 deployed during an MWD operation in which measurements in an earth well bore 412 are taken with a drill bit 415 and at least some of the drill string 410 in the well bore 412, during drilling, pausing, and/or tripping. A platform and derrick 414 are positioned over the well bore 412 formed in the earth by rotary drilling. The drill string 410 is suspended within the well bore 412 and includes the drill bit 415 at its lower end. The drill string 410 and the drill bit 415 attached thereto are rotated by a rotating table 416 that engages a kelly 418 at the upper end of the drill string 410. The drill string 410 is suspended from a hook 420 attached to a travelling block (not shown). The kelly 418 is connected to the hook 420 through a rotary swivel 422 that permits rotation of the drill string 410 relative to the hook 420. A pump 424 circulates lubricating drilling fluid, or mud, 426 from a pit 428, into the drill string 410 through the swivel 422, downward (arrows 430) through the drill string 410, out the drill bit 415, back up (arrow 432) through an annulus 434, and back to the pit 428 for recirculation.

Mounted within the drill string 410, preferably near the drill bit 415, is a bottom hole assembly 435. The bottom hole assembly 435 can measure, process, and store information, and communicate with the earth's surface. As used herein, "near the drill bit" means within several drill collar lengths from the drill bit 415. The assembly 435 includes whatever instrumentation is necessary to obtain the data for the desired calculation. Since the desired calculation and, hence, the type of data, will vary from one implementation to another, the instrumentation in the bottom holes assembly 435 will be implementation specific.

In the embodiment illustrated, a drill collar 434 and an optional stabilizer collar 436 are shown successively above the bottom hole assembly 435. The collar 434 may be, for example, a pony collar or a collar housing measuring apparatus which performs measurement functions other than those described herein. Located above stabilizer collar 436 is a surface/local communications subassembly 438. The subassembly 438 includes a toroidal antenna 440 used for local communication with the instrumentation of the bottom hole 45 assembly 435. The subassembly 438 may also include an acoustic communication system (not shown) that communicates with a similar system (also not shown) at the earth's surface via signals carried in the drilling fluid 426 in a conventional manner.

The implementation of FIG. 4A also includes a variety of surface instrumentation 445. The surface instrumentation 445 comprises a receiver subsystem 446, a recorder 448, a processor 450, and a transmitter subsystem 452. The receiver subsystem 446 receives data and other information transmitted uphole from the drill string 410 and forwards it to the recorder 448 and the processor 450. The recorder 448 records the data, which is used later in the design and analysis of well treatment procedures. The processor 450 also generates a variety of control signals that control the operation of the pump 424 and are transmitted to the pump 424 via the transmitter subsystem 452. In some variations, the transmitter subsystem 452 may also transmit control signals generated by the processor 450 to control the operation of various tools on the drill string 410.

A wireline well logging operation by which data may alternatively be acquired is shown in FIG. 4B. In FIG. 4B, a downhole tool 460 is suspended in a bore hole 462 from a wireline cable 464. In wireline well logging, one or more downhole tools 460 are connected to a power and data transmission cable or "wireline" 464 and lowered into the bore hole 462 to obtain measurements of geophysical properties for the area surrounding the bore hole 462. The wireline 464 supports the tool(s) 460 as they are lowered into the bore hole 462, supplies power to the tool(s) 460 and provides a communication medium to send signals to the tools and receive data from the tools 460. Commonly, the tools 460 are lowered to a depth of interest in the bore hole 462 and are then retrieved. As the tool(s) 460 are retrieved, they send data about the geological formations through which they pass through the wireline 464 to data acquisition and processing equipment 465 at the surface, usually contained inside a logging truck or a logging unit (not shown).

The data acquisition and processing equipment 465, including software, compiles the data from the tool(s) 460 into a "log," a plot which presents the geophysical information concerning the geological formations encountered by the bore hole 462, frequently by depth. Logs can also be used to evaluate current production from producing wells or to inspect the integrity of production equipment in a producing well. In any case, the data gathered during the logging operation is generally presented on the log by depth, but may also be presented by time, or any other index by which multiple physical entries are recorded. Various data acquisition and processing software programs are known in the art. An example of data acquisition and processing software is Schlumberger's proprietary MAXIS™ system, which is a suite of separate computer programs.

The data acquisition and processing software writes the log data to two types of locked format files on disk. By "locked," it is meant that the format files cannot be written to and read from at the same time. The two types of locked format files are distinguished by the type of information they contain: one is a data format file and the other is a graphics format as file. The data format file contains the numerical properties of the log data; the graphics format file contains the pictorial representation of the data. The data acquisition and processing software continues writing the log data to the locked data format file and the locked graphics format file until the log is complete. Then the data from the locked data format file and the locked graphics format file may be translated from digital readings into physical form by a marking device such as a printer. In addition to the locked data format file and the locked graphics format file, the data acquisition and processing software may send the log data to a viewing monitor, via a renderer. Using the monitor, the well logging professional ("logging engineer") conducting the logging operation can view the log as it is being compiled.

After the log is compiled, it can be transmitted to the operating company's headquarters for interpretation and review by management. Data generated by MWD operations such as that shown in FIG. 4A are handled similarly using the surface instrumentation 445. The paper log may be sent directly from the wellsite to the operating company as a facsimile. Alternatively, the completed locked data format file can be sent from the wellsite to a data processing center via satellite using a protocol such as DECNET. The data processing center could in turn transmit the log as a facsimile to the operating company. As another alternative, the completed locked data format file can be sent from the wellsite to an operating company using a computer program such as Blast™ by U.S. Robotics.

Returning to FIG. 3, as part of the process 300, the data acquired as discussed above can be used in well or reservoir treatment design and analysis. The engineer will initiate a processing session by establishing a communications link between the client computing device 130, 140 and the server computing device 110, as set forth in the box 320. Data will be input into the program through the client computing device 130, 140 to the server 110, as set forth in the box 330.

The input data can also be stored on the client computing device, e.g., the client 130, 140 in FIG. 1. Typically, all the data from a single processing session is stored on the same client. Different sets of data, or even different copies of the same set of data, may be stored on separate clients 130, 140. The data is stored, as discussed above, in pages (not shown) in the data structure 160. In the illustrated embodiment, the data is entered and stored using IIS and ASP technology, i.e., entered through HTML forms and stored in XML format either on the server 110 or on the client 130, 140.

The stored data can be recalled from a client computing device 130, 140 and re-sent to the server computing device 110 at a different time. In the illustrated embodiment, the data is handled in ASP pages and, when the data is communicated, the data is generated into an HTML page and communicated to the server 110. Note, however, that the manner in which the data is communicated will be implementation specific depending on the type of hardware and protocols used to implement any given embodiment.

The method 300 continues by processing the data at the server computing device 110, as set forth in the box 340. In the illustrated embodiment, this processing includes the invocation of any necessary utilities from the utilities library layer 220, e.g., units conversion and data validation. The utilities library layer 220 is invoked by the tool logic 280 in the analysis layer when needed. The tool logic 280 then invokes the validations component 270 to perform its own validation and the CalcDriver component 275 to actually perform the calculation necessary for the analysis. Note again, however, this aspect of the invention admits some variation as not all implementations must necessarily employ a three-layer functional schema.

The method 300 then proceeds by communicating the results to the client computing device 130, 140, as set forth in the box 350. The analysis results will be sent to the same client 130, 140 on which the original session was initiated. In the illustrated embodiment, this involves the tool logic 280 in the analysis layer 210 invoking the DataControl component 265 in the utilities library layer 220 which generated the analysis results into an HTML page 285. The generated HTML page 285 is then transmitted back into the application layer 230, which is the mechanism by which the tool 170 on the server 110 communicates to the application program 165 on one of the clients 130, 140. The generated HTML page 285 may then be handled as desired as a part of communicating the results. For instance, the DataStore component 240 in the utilities library layer 220 may be invoked to store the analysis results as intrinsic objects in a data structure (not shown). Or, the FileManager component 245 might be invoked to output the results to a user either by printout or by display.

In the illustrated embodiment, the access to the computing system 100 requires a login using the lightweight directory access protocol ("LDAP") protocol. LDAP includes at least two useful features: it tracks users' activities and it supports the TCP/IP protocol on which communications on the Internet are founded. Tracking users is particularly useful in that the administrator can see who is using what tools and determine where they are located. This, in turn, can permit more focused marketing of the services associated with those tools to prospective clients. TCP/IP support is particularly useful in that, in one particular implementation, the data is communicated from the client to the server over the Internet. However, other protocols may be used in alternative embodiments, particularly if these functionalities are not desired.

As is apparent from the discussion above, some portions of the detailed descriptions herein are consequently presented in terms of a software implemented process involving symbolic representations of operations on data bits within a computer memory. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

For instance, all the software necessary for implementing the illustrated embodiment resides on the server 110. In this embodiment, then, one aspect of the invention is a variant of the method 300 in FIG. 3. In this variant, the method begins by establishing a communications link between a client 130, 140 and the server 110. Next, the server 110 receives a plurality of oilfield or waterfield engineering data input from the client 130, 140 to the server 110. The server 110 then processes the data at the server 110 and communicates the results to the client 130, 140. Since the software resides in one location within the computing system 100, instructions for performing this method may be encoded on a program storage medium, e.g., the floppy disk 185, the optical disk 190, or the hard drive (not shown) of the server 110 in FIG. 1.

Thus, the invention in its various aspects includes not only a method for centralized oilfield or waterfield data processing from distributed locations, but also a computing system programmed to perform such a method. In yet another aspect, the invention includes instructions encoded on a program storage medium that, when executed by a computing device, perform such a method. For instance, one or more of the floppy disk 185, the optical disk 190, and the hard drives (not shown) of the server 110, client 130, and client 140 may be so encoded. The program storage medium may be electrical, paper, magnetic, or optical, and this aspect of the invention is not limited by the nature of the medium.

This particular implementation provides numerous advantages over the state of the art. More particularly, the:
- single source calculation engine allows consistency in calculations and design across a company's locations while easing software maintenance of analysis tools;
- shared utilities provide consistency in units conversions across analyses and a centralized database for commonly used information;
- calculation usage may be tracked to provide faster analysis of potential markets, more focused marketing efforts, more efficient allocation of training efforts, and a better understanding of logistical needs;
- centralized collection of comments and defects allows faster response to field problems and requirements; and
- shorter application development and technology transfer times.

These advantages and benefits may be found in one or more alternative embodiments to a greater or lesser degree.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for centralized processing of oilfield or waterfield data for design and analysis from distributed locations, the method comprising:

acquiring a plurality of oilfield or waterfield engineering data;

establishing a communications link between a client computing device and a server computing device;

inputting the oilfield or waterfield engineering data from the client computing device to the server computing device;

processing the data at the server computing device invoking a program utility; and communicating the results to the client computing device and;

tracking the locations employing a particular program utility.

2. The method of claim 1, wherein acquiring the plurality of oilfield or waterfield data includes performing at least one of a measurement while drilling operation and a wireline measurement operation.

3. The method of claim 1, further comprising storing the input data on at least one of the client and the server computing device.

4. The method of claim 3, wherein storing the data includes storing the data in a data structure selected from the group consisting of a database, a linked list, and a file.

5. The method of claim 1, wherein establishing a communications link from the client computing device to the server computing device includes establishing the communications link over the Internet, an intranet, a local area network, or a wide area network.

6. The method of claim 1, wherein processing the data at the server computing device includes at least one of:

determine the volume of scale inhibitor required for a squeeze treatment in an existing fracture;

calculate the injection pressure as a function of pumping time for a squeeze treatment in an existing fracture, determine the volume of mud filter cake removal treatment need to treat an open hole portion of a well;

determine the time required to place a mud filter cake removal treatment;

determine the amount of bridging material dissolver needed for a mud filter cake removal treatment;

determine the concentration of bridging material dissolver needed for a mud filter cake removal treatment; or estimate post-treatment skin.

7. The method of claim 1, wherein communicating the analysis results from the server computing device to the client computing device includes communicating the data over the Internet, a local area network, or a wide area network.

8. The method of claim 1, wherein the communication link between the client computing device and the server computing device employs the LDAP protocol for client login.

* * * * *